Dec. 5, 1944.  R. M. MacLEOD  2,364,153
PLOTTING MACHINE
Filed March 29, 1943  3 Sheets-Sheet 1

INVENTOR.
ROBERT M. MacLEOD,
BY
ATTORNEY.

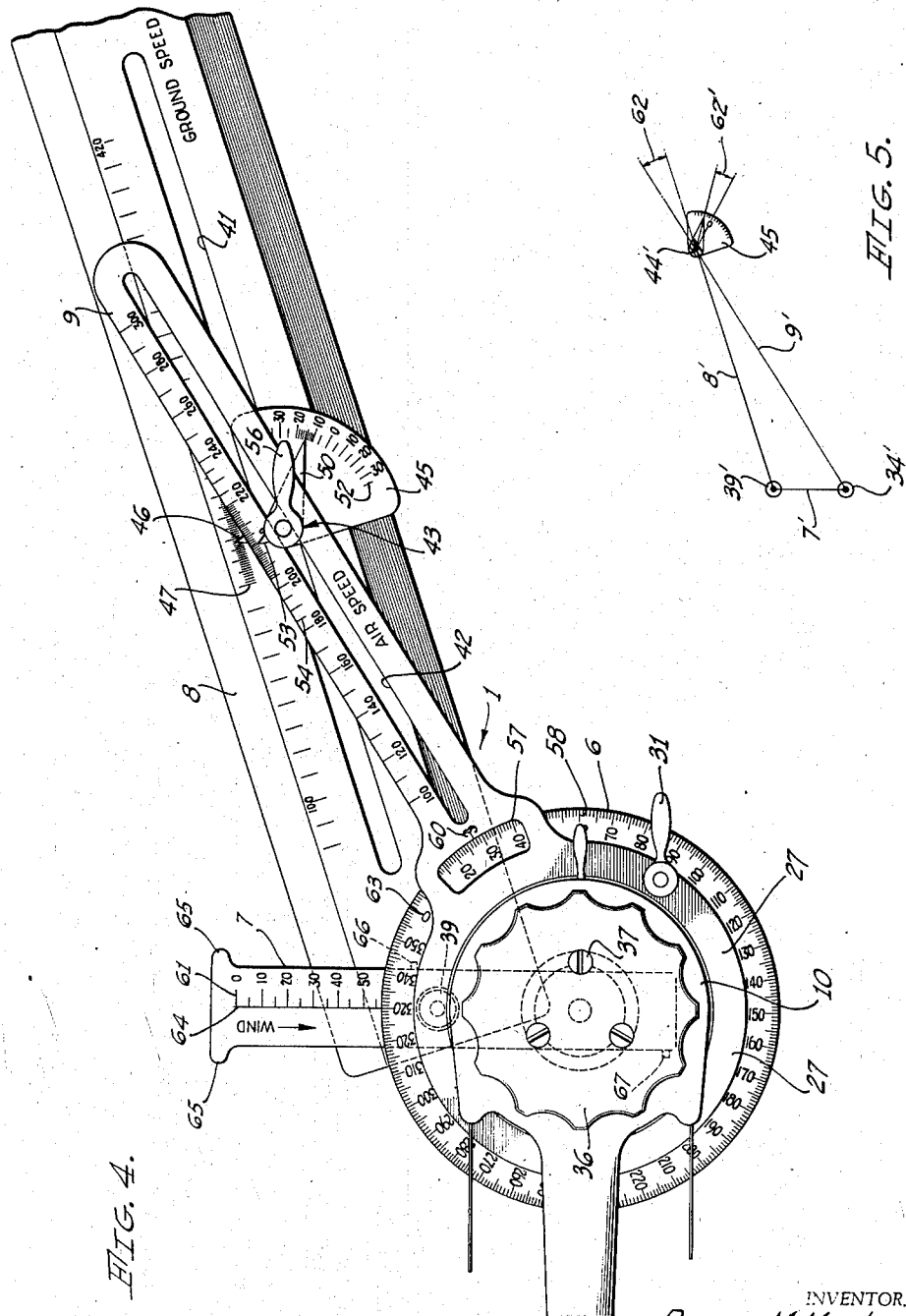

Dec. 5, 1944.  R. M. MacLEOD  2,364,153
PLOTTING MACHINE
Filed March 29, 1943   3 Sheets-Sheet 3
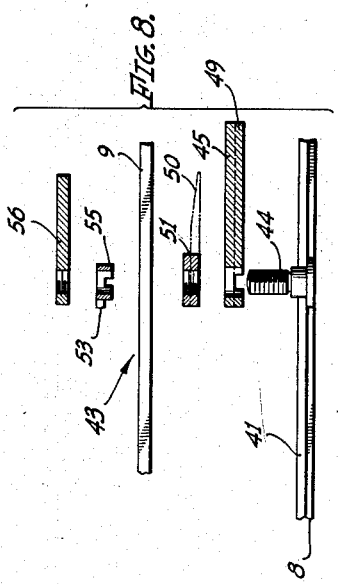
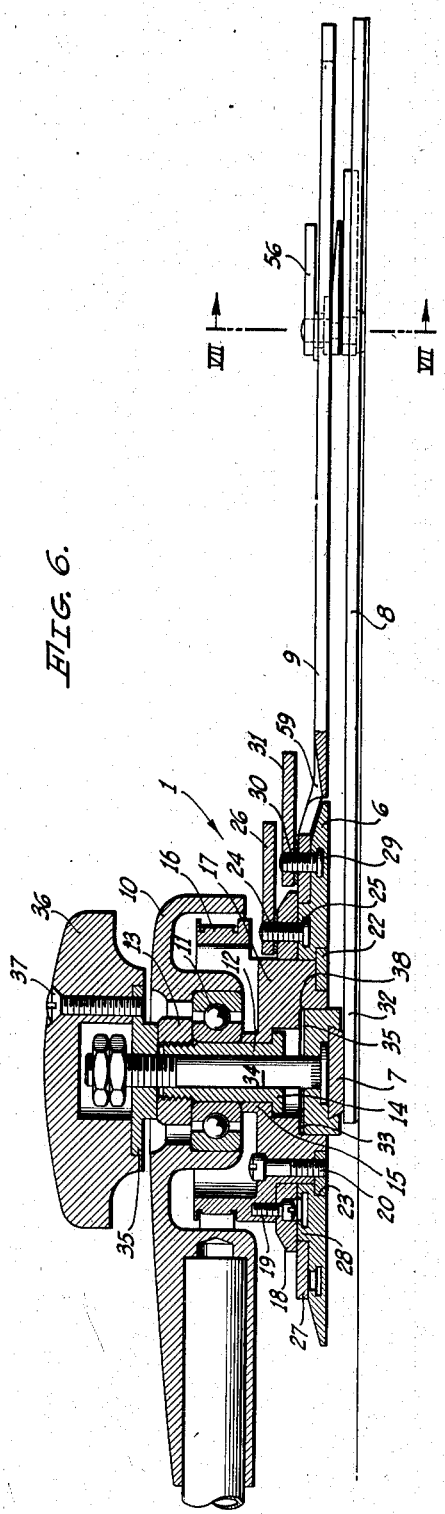
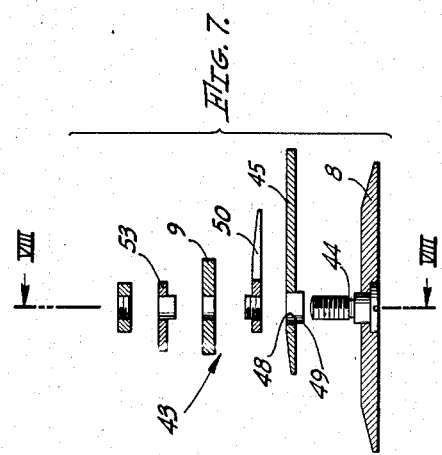
INVENTOR.
ROBERT M. MacLEOD,
BY
ATTORNEY.

Patented Dec. 5, 1944

2,364,153

UNITED STATES PATENT OFFICE 2,364,153

PLOTTING MACHINE

Robert M. MacLeod, East Pasadena, Calif., assignor to Vard, Inc., Pasadena, Calif., a corporation of California Application March 29, 1943, Serial No. 480,896

1 Claim. (Cl. 33—102)

My invention relates to a plotting machine and has particular reference to an apparatus for solving vector triangle problems which finds particular utility when used as a navigating aid on aircraft.

In the navigation of an aircraft the existence of a wind and particularly a cross-wind will shift the track or actual course of the plane relative to the ground from the apparent course or heading which is indicated by the aircraft's compass. The presence of a wind will also cause the actual velocity of the aircraft relative to the ground to be different from the air speed which is indicated by the usual air speed indicators.

It is thus necessary for the pilot or navigator of the aircraft to take the wind into account in determining the heading or compass direction in which the plane should be directed in order to cause it to pursue a given compass course with respect to the ground. The wind must also be taken into consideration in determining the actual velocity of the plane with respect to the ground which in turn determines the length of time the plane must fly at a given indicated air speed to traverse a selected distance.

The taking into account of the wind requires the solution of a vector triangle consisting of the wind direction and velocity, the air speed of the plane and the heading or compass course being followed, and the track or desired course to be followed by the plane, and the actual velocity of the plane along that course.

Prior to my invention it was the practice to solve such problems geometrically and recently certain mechanical aids in the nature of slide rules or hand calculators have been devised to assist in making the required calculations. Such devices, however, embody the disadvantage of requiring the various angular and linear measurements to be taken from the aircraft instruments or other sources of information, referred to the chart or map which indicates the desired course, and introduced into the calculating device. The results of the calculation must then be applied to the chart as by means of scales and protractors before it is possible to ascertain the result of the calculation. Such an operation presents many opportunities for errors and also requires the expenditure of a considerable time under circumstances where high speed calculations are essential.

It is, therefore, an object of my invention to provide a plotting mechanism which may be used directly in connection with a chart or map to solve vector triangles involving the magnitude and direction of the apparent course of the aircraft, the actual course of the aircraft and any wind which may exist.

It is also an object of my invention to provide a plotter of the character set forth in the preceding paragraph which is mounted upon a parallel motion mechanism to permit the device to be readily moved from place to place on the chart.

It is additionally an object of my invention to provide a plotter which includes means for reproducing mechanically the vector triangle involved in the solution of a particular navigation problem.

It is a still further object of my invention to provide a plotter of the character set forth in the preceding paragraph which includes also means for indicating the magnitudes of the linear and angular dimensions of the vector triangle.

It is an additional object of my invention to include in a plotter of the character set forth hereinbefore a drift angle protractor for indicating directly the angle of drift resulting from a cross-wind.

Other objects and advantages of my invention will be apparent from a study of the following specifications, read in connection with the accompanying drawings, wherein:

Fig. 4 is an enlarged plan view of the calculator portion of the plotter, showing the relative position and arrangement of the various scales which are employed to indicate the magnitudes of the various quantities involved;

Fig. 5 is a vector diagram illustrating graphically the vector diagram which is reproduced by the plotter shown in Fig. 4;

Fig. 6 is a vertical cross-sectional view of the protractor head assembly which is shown in Fig. 4;

Fig. 7 is an exploded cross-sectional view taken substantially along the line VII—VII of Fig. 6 and illustrating the details of construction of the pivotal interconnection of the heading arm with the track arm; and Fig. 8 is an exploded cross-sectional view taken substantially along the line VIII—VIII of Fig. 7.

Figure 1:
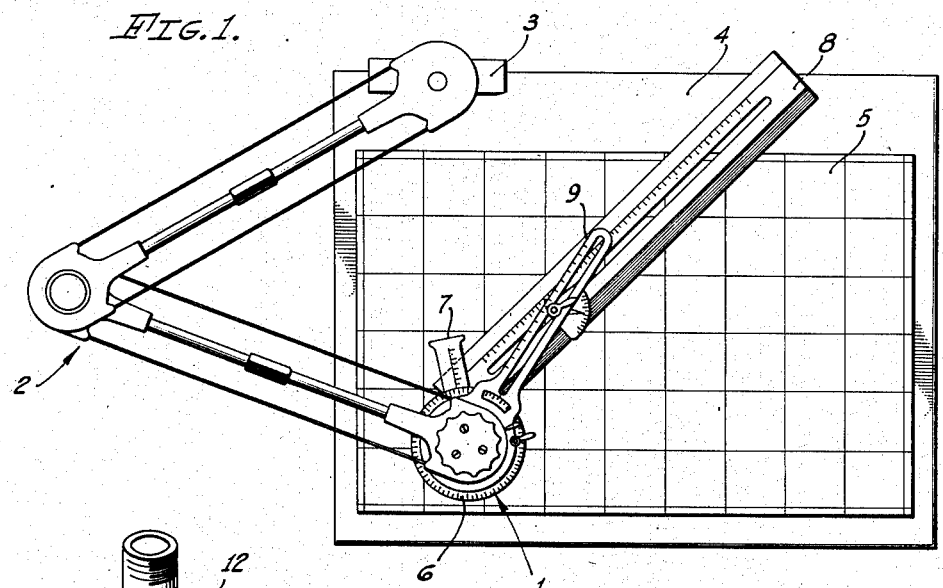
Fig. 1 is a plan view illustrating the general form and appearance of the preferred embodiment of my invention, the plotter being illustrated as comprising the head portion of a drafting machine of the endless band and pulley type.

Referring to the drawings, I have illustrated in Fig. 1 the preferred embodiment of my invention as comprising a vector plotter 1 secured to a parallel motion mechanism 2 in place of the usual protractor head assembly of such a mechanism. The parallel motion mechanism illustrated comprises the endless band and jointed strut type, but other types of parallel motion mechanisms may be used, as desired. The parallel motion mechanism 2 is illustrated in Fig. 1 as being secured as at 3 to the upper edge of a table or chart board 4 upon which is placed or held a chart 5.

The plotter 1 is best illustrated in Figs. 4 and 6 and comprises a protractor scale 6 with which is associated a wind arm 7, a track arm 8 and a heading arm 9, the arms 7, 8 and 9 being adjustably associated to reproduce the vector triangle, the solution of which is desired.

The plotter 1 is, according to the preferred embodiment of my invention, formed as the protractor head of the parallel motion mechanism 2 so that it may be moved to any desired position on the chart 5 while preserving a given angular orientation. To this end the parallel motion mechanism 2 includes a pulley bracket 10 within which is positioned an anti-friction bearing such as the ball bearing 11, the outer race being pressed into a suitable recess provided in the bracket 10.

The inner race of the bearing 11 receives a spindle sleeve 12 which is threaded at one end to receive a clamping nut 13 and headed at the other end as indicated at 14. The sleeve 12 in passed through the central hub 15 of a pulley 16 which forms the head end pulley of the parallel motion mechanism 2. The pulley hub 15 and the bearing 11 are clamped between the head 14 and the nut 13, by which means the pulley 16 is journaled for rotation relative to the bracket 10.

The pulley 16 is arranged to support the protractor 6 and the arms 7, 8 and 9. For this purpose the under side of the pulley 16 is turned to define a downwardly projecting boss 17 which is surrounded by a mounting ring 18 secured to the pulley as by means of screws 19. The protractor plate 6 may also encircle the boss 17 and be held against axial movement relative to the pulley 16 by means of a washer-like retaining ring 22 which is clamped solidly against the under surface of the pulley 16 by means of screws 20. The outside diameter of the retaining ring 22 is made larger than the inside diameter of the protractor plate 6 and the plate 6 is notched as indicated at 23 to receive the retaining ring 22.

By this construction the protractor plate 6 is held against axial movement but is mounted upon the pulley 16 for angular adjustment relative thereto. This permits the origin or zero of the protractor plate to be turned to any desired position so that it may be aligned in direction with the North-South ordinate of the chart 5.

In order that the protractor ring may be locked in its adjusted position, a locking screw 24 having a rectangular head 25 is positioned in a T-slot formed in the upper surface of the protractor ring 6. The screw 24 is extended upwardly through a clearance hole in the mounting ring 18 to receive on its upper end a clamping nut 26 which, upon being turned, will clamp the protractor ring securely against the under surface of the mounting ring 18.

The protractor plate 6 likewise serves as a support for the heading arm 9. The arm 9 has a general shape and form which is best illustrated in Fig. 4 and which is characterized by a large ring-like portion 27 which rests upon the upper surface of the protractor plate 6 and surrounds an upwardly extending boss 28 formed thereon and serving as a guide or journal about which the ring portion 27 is freely rotatable.

The outside diameter of the boss 28 is preferably made somewhat less than the outside diameter of the mounting ring 18 so that the ring portion 27 is received in an annular groove and so held against axial movement relative to the rest of the mechanism.

To permit the locking of the heading arm 9 in any angular position in which it may be set, the upper surface of the protractor plate 6 directly below the ring portion 27 is formed with a T-slot in which is received the rectangular head 29 of a clamp screw 30. A locking nut 31 threaded upon the upper end of the screw 30 serves to clamp the ring portion 27 to the protractor plate 6 and lock these two elements against rotation relative to each other.

Figure 2:
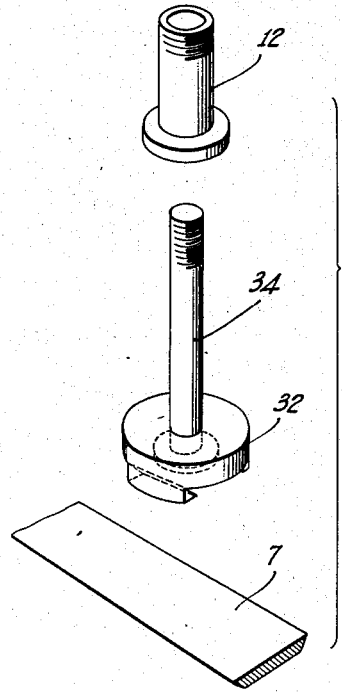
Fig. 2 is an exploded perspective view illustrating the clamping mechanism which is used to lock the wind scale at any desired setting.

The wind scale 7 preferably comprises a short flat member of trapezoidal cross section which is received in a similarly shaped groove formed in a clamping element 32. The element 32 comprises a substantially solid cylindrical member which is received in a counterbore formed in the under side of the pulley 16. From the member 32 rises a vertical shaft 34 which passes upwardly through the interior of the spindle sleeve 12. Each of the parts 7, 12 and 32 are shown in perspective in Fig. 2.

The upper end of the stem 34 is threaded to receive a clamping plate 35 which is secured to the under surface of a knob or hand wheel 36 as by means of screws 37. The clamping plate 35 normally rests upon the upper surface of the nut 13 so that when the plate is rotated as by turning the knob 36, the stem 34 will be moved upwardly to lift the clamping element 32, a clearance space 38 being provided for this purpose between the element 32 and a shoulder 33 formed by the counterbore in the pulley 16.

The trapezoidal channel which is formed in the under surface of the member 32 makes a loose fit with the wind scale 7 so that the same may be readily slid longitudinally through the channel. When the knob 36 is turned and the member 32 is lifted relative to the pulley 16, upward movement of the wind scale 7 is prevented by the engagement of its upper surface with the under surface of the pulley boss 17. The sloping surfaces of the channel in the member 32 are thus brought into firm frictional engagement with sloping sides of the wind scale 7 and so lock the wind scale against sliding movement relative to the clamping elements.

Furthermore, when the knob 36 is released to permit free sliding movement of the wind scale 7, the same is freely rotatable about the axis of the stem 34, this rotation being permitted by rotation of the element 32. When, however, the knob 36 is turned to lock the wind scale 7 against sliding movement, the scale 7 is clamped securely against the under surface of the pulley 16, thus effecting a locking of the scale 7 against angular movement as well as sliding movement.

Figure 3:
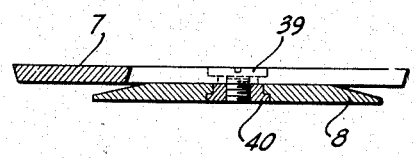
Fig. 3 is a cross-sectional view illustrating the details of construction of the pivotal connection between the wind scale and the track scale.

The wind scale 7 extends across and lies upon the upper surface of the track arm 8 and is pivotally connected to the track arm 8 in the manner which is illustrated in Fig. 3. The wind scale 7 is bored and counterbored from its upper surface to receive a pivot screw 39 which is threaded into a suitable threaded insert 40 pressed or otherwise suitably secured in the track arm 8.

By this means the track arm 8 is pivotally connected to the wind scale 7 for free pivotal movement about the pivot screw 39.

The track arm 8 and the heading arm 9 are both longitudinally slotted as indicated, respectively, at 41 and 42. These slots receive a movable pivot structure indicated generally at 43 which serves the dual purpose of providing a pivotal interconnection of the arms 8 and 9 and a means for changing the effective length of these arms. The pivot mechanism 43 is best illustrated in Figs. 7 and 8 as comprising a shoulder screw 44 which is passed upwardly through the slot 41 in the track arm 8, the slot 41 being provided with a T-shaped cross section for accommodating the head of the screw 44.

Upon the screw 44 is placed a drift protractor 45 which, as is shown in Fig. 4, comprises a flat plate-like quadrant having formed integrally therewith a pointer member 46 adapted to indicate the magnitude of the true ground speed of the aircraft upon a scale or set of graduations 47 suitably inscribed upon the upper surface of the track arm 8.

The drift protractor 45 is bored as indicated at 48 to receive the shoulder portion of the pivot screw 44. Upon the under surface of the drift protractor 45 there is formed a longitudinally extending key or rib 49 having a width adjusted to be closely received within the slot 41 by which means the protractor 45 is held in a fixed angular position relative to the track arm 8.

Upon the upper end of the pivot screw 44 there is threaded a drift pointer 50. The pointer 50 screws down against the shoulder of the shoulder screw 44 and serves to hold the shoulder screw 44 in place, the thickness of the member 45 and its key 49 being adjusted to provide some clearance between the protractor pointer 50 and the upper surface of the track arm 8 so that the assembly of protractor pointer 50 and pivot screw 44 may be rotated relative to the track arm 8 and the drift protractor 45.

The protractor pointer 50 is provided on its upper surface with a longitudinally extending rib or key 51 having a width adjusted to be closely received within the slot 42 in the heading arm 9 so that the pointer 50 is held in a fixed angular position relative to the heading arm 9 so that the angular relation between the arms 8 and 9 may be indicated by the angular relation of the pointer 50 relative to a protractor scale 52 suitably inscribed on the upper surface of the protractor 45.

Upon the upper end of the screw 44 and above the heading arm 9 there is placed a pointed member 53 which is adapted to overlie the heading arm 9 and indicate on a suitable set of graduations 54 inscribed on the upper surface of the arm 9 the true air speed of the air craft. To hold the pointer member 53 at right angles to the length of the heading arm 9, the same is provided on its under surface with a longitudinally extending rib or key 55 having a width adjusted to be closely received within the slot 42 in the arm 9. A clamping nut 56 is threaded upon the upper end of the screw 44 so that when the same is turned the pointer 53 and heading arm 9 may be clamped against the protractor pointer 50 and so lock the entire assembly, including all of the elements shown in Figs. 7 and 8 except the track arm 8, against movement relative to each other. Such a locking of the assembly leaves the entire assembly free to slide along the length of the slot 41 in the track arm 8.

The inner portion of the heading arm 9 where it joins the ring-like portion 27 is provided with a window or aperture 57 through which a protractor scale 58 inscribed on the upper surface of the protractor plate 6 may be observed. The shape of the heading arm 9 is best shown in Fig. 6 as being bent downwardly over the sloping upper surface of the protractor plate 6 and as having a central portion 59 depressed to bring the upper surface thereof, upon which is inscribed a witness point 60, into the plane of the upper surface of the protractor plate 6, thus permitting the angular position of the heading arm 9 to be readily observed. The wind scale 7 is provided on its upper surface with a set of graduations 61 representative of various wind velocities. The graduations which are shown in Fig. 4 are intended to be read at the point where the scale passes under the outer periphery of the protractor plate 6.

I have shown in Fig. 5 the vector triangle which is solved by the device above described. In Fig. 5 the lines 7′, 8′ and 9′ represent the effective lengths of the wind scale 7, the track arm 8 and the heading arm 9, the lengths and angular relations of these arms being determined by the positions of the three pivot points 34′, 39′ and 44′ corresponding respectively to the axis 34 of the pulley 16, the pivotal connection 39 between the wind scale 7 and the track arm 8, and the pivot screw 44 which serves to interconnect the track arm 8 and the leading arm 9.

In the vector diagram of Fig. 5 the arm 7′ represents the magnitude and direction of the wind relative to the surface of the ground and the line 8′ represents the direction of the aircraft's velocity relative to the ground, while the length of the line 9′ represents the magnitude of the aircraft's velocity in air. Thus the length of the line 8′ is fixed and represents the velocity of the aircraft relative to the surface of the ground and the angular position of the line 9′ is similarly fixed to represent the direction or heading to be followed by the aircraft. Likewise the angle represented by the dimension line bearing the reference character 62 comprises the drift angle or angular relation between the apparent course or heading of the aircraft and the actual course or track of the aircraft relative to the surface of the ground. This angle is indicated as shown at 62′ on the drift protractor 45.

In placing the mechanism in operation, the protractor scale is first adjusted with respect to the parallel motion mechanism to place the index or zero (63 in Fig. 4) in alignment with the North-South or meridian lines of the chart 5. This is most easily accomplished by locking the wind scale 7 in the zero position, by which operation the pivot points 39 and 44 are placed in coaxial positions. The heading arm 9 is then turned until the witness point 60 is opposite the zero 63 on the protractor 6 and the heading arm 9 is then locked to the protractor by the clamping nut 31. The clamping nut 26 for the protractor scale is released whereupon the arms 8 and 9 (now parallel to each other) are turned to a position aligned with the meridian lines of the chart 5. The clamping nut 26 is then employed to lock the protractor plate 6 to the pulley 16 of the parallel motion mechanism so that the protractor plate 6 will thereafter be held in the proper fixed orientation relative to the chart 5.

The problem which frequently confronts a navigator is that of determining the heading or compass course to be followed to pursue an actual course between two selected locations indicated on the chart 5. A concurrent problem is that of determining how long the aircraft should be flown along that heading to reach the desired destination. In the solving of such a problem the wind scale 7, the track arm 8 and heading arm 9 are each released through manipulation of the knob 36, the clamping nut 56 and the clamping nut 31. The pivot assembly 43 may then be slid along the slot 42 in the heading arm 9 until the pointer 53 indicates on the scale 54 the true air speed at which the aircraft will be operated.

When so adjusted the assembly 43 may be locked to the heading arm 9 by turning the clamping nut 56. The wind scale is then turned to a position such that a longitudinal line 64 inscribed on the upper surface of the wind scale 7 indicates on the protractor 6 the known azimuth of the wind, the wind scale 7 being extended outwardly from the protractor plate 6 in accordance with the known direction from which the wind is blowing. Adjustment of the wind scale 7 is facilitated by providing finger-grip portions 65 (Fig. 4). Also the sliding movement of the wind scale 7 is preferably limited as by pins 66 and 67 positioned to engage the member 32 in the extreme positions of the scale 7.

By sliding the wind scale 7 to a position such that the edge of the protractor plate 6 indicates on the graduations 61 the known magnitude of the wind, the wind scale may be set to conform to that known magnitude. When the scale 7 is thus set to conform to the known magnitude and direction of the wind, the same is locked by turning the knob 36.

When these preliminary operations are completed, the plotter is moved over the surface of the chart 5 and the angular position of the arms 8 and 9 adjusted until one edge of the arm 8 may be so laid on the chart as to join the starting point of the aircraft with the proposed destination. Such a movement of the arms is permitted by the free pivotal connection of the arm 8 to the wind scale 7, the sliding connection between the arms 8 and 9 and the free pivotal connection of the arm 9 to the protractor 6.

When the arm 8 is positioned as described, it then defines on the chart 5 the proposed track or course of the aircraft relative to the surface of the ground. The entire assembly may then be locked against relative movement of the parts by locking the heading arm 9 to the protractor 6 through manipulation of the clamping unit 31. It will be seen that this operation serves to fix the length of two sides of the triangle and the magnitude of the included angle so that the shape of the triangle is finally determined.

Having thus set the instrument, the heading or compass course to be followed by the aircraft in order to pursue the desired course relative to the ground surface may then be read on the protractor scale 6 opposite the witness point 60.

To calculate the time of the proposed flight, the actual speed of the aircraft relative to the ground may be read on the graduations 47 of the arm 8 opposite the pointer 46. Likewise the angle of drift may be determined by reference to the drift protractor 45.

The drift protractor 45 may be used in those cases where the probable direction of the wind is well known, as when flying in a location where certain prevailing winds exist, but where the actual magnitude of the wind is not known. In such circumstances the drift angle may be determined through the use of a conventional drift indicator. Thereafter with the pivot assembly 43 locked to the heading arm 9 at the true air speed of the aircraft, the arm 9 is released from the protractor scale 6 and the wind scale 7 is released through manipulation of the knob 36 and manually held in a position corresponding to the known direction of the prevailing winds, while the arm 8 is so placed as to extend between the starting point and the desired destination on the chart. By then sliding the protractor plate along the wind scale to a position such that the previously determined angle of drift is indicated on the drift protractor 45, the vector triangle is established. The knob 36 and the clamping nut 31 may then each be manipulated to lock the wind scale 7 and the heading arm 9. The desired heading may then be read on the protractor scale 6 opposite the witness point 60.

A problem which is the converse of that described exists when the heading, drift angle and wind direction are known and it is desired to determine the actual course of the plane relative to the surface of the ground. In such a case the heading arm 9 is locked to the protractor plate 6 at the known heading and the pivot assembly 43 is locked to the heading arm 9 at the known true air speed of the aircraft. With the knob 36 released, the wind scale may then be slid relative to the protractor plate 6 while being manually held in an angular position corresponding to the known wind direction until the known angle of drift is indicated on the drift protractor 45. When this condition obtains the triangle may be fixed by locking the knob 36. The track arm 8 is then held in an angular position relative to the chart 5 corresponding to the direction of flight of the aircraft.

It will be noted that six variable quantities are involved in the determinations made by the plotter; namely, three directions and three magnitudes. Furthermore, the fixing of any four of these six quantities determines the remaining two so that with the plotter of my invention, if any four of the quantities are known, the other two may be determined. Furthermore, these calculations are made with reference to the chart 5, thus eliminating the necessity of any transfer of information from a calculating device to the chart itself.

From the foregoing it will be observed that I have provided a vector plotter which is particularly adapted to the solution of the vector triangle problems raised in the navigation of aircraft. The device of my invention is so arranged as to permit it to be used directly on a chart secured to the chart board which carries the instrument. By virtue of the adjustable features of the device of my invention, the plotter may be so oriented with respect to the board that it is unnecessary to take into account the angular orientation of the coordinate system of the chart in determining the various directions involved. Instead, each direction is referred to the North-South line of the compass being used to guide the flight of the aircraft.

It will be seen that the device is small and compact so that it may be inexpensively manufactured and constructed to have a very light weight, particularly adapting it to use on aircraft.

While I have shown and described the preferred embodiment of my invention, I do not desire to be limited to any of the details of construction shown or described herein, except as defined in the appended claims.

I claim:

In a plotting instrument, a support having formed therein a recess extending upwardly from the bottom thereof, a scale having two parallelly disposed side surfaces and two angularly disposed side edges, a clamp member disposed below said support and having a channel formed in one surface thereof with a cross section congruent with the cross section of said scale to support said scale for longitudinal sliding movement, said clamping member being mounted for vertical movement in said recess, means on said clamping member engaging said support to support said scale for pivotal movement, and means attached to said clamping member for drawing the same upwardly to wedge said scale between said clamping member and said support to thereby secure said scale against sliding and pivotal movement.

ROBERT M. MacLEOD.